(12) United States Patent
Hsu et al.

(10) Patent No.: US 6,968,245 B2
(45) Date of Patent: Nov. 22, 2005

(54) FLEXIBLE RECIPE MODELING AND RECIPE CLUSTER MANAGEMENT SYSTEM

(75) Inventors: Hsien-Jung Hsu, Taipei (TW); Chin-Yen Lin, Hsin-Chu (TW); Hsiang-Jui Cheng, Hsinchu (TW)

(73) Assignee: Taiwan Semiconductor Manufacturing Co., Ltd., Hsin Chu (TW)

( * ) Notice: Subject to any disclaimer, the term of this patent is extended or adjusted under 35 U.S.C. 154(b) by 287 days.

(21) Appl. No.: 10/217,510

(22) Filed: Aug. 13, 2002

(65) Prior Publication Data

US 2004/0034648 A1 Feb. 19, 2004

(51) Int. Cl.[7] ............... G06F 19/00; G06F 3/00; G06F 9/00; G05B 15/00
(52) U.S. Cl. ............ 700/96; 700/97; 700/99; 700/100; 700/115; 700/121; 700/83; 715/810; 715/845; 715/964
(58) Field of Search .............. 700/9, 11, 15, 17, 700/19, 28, 29, 83, 95–97, 99, 104, 106, 700/107, 115–117, 121; 715/810, 845, 964

(56) References Cited

U.S. PATENT DOCUMENTS

| | | | | |
|---|---|---|---|---|
| 4,835,730 A | * | 5/1989 | Shimano et al. | 700/257 |
| 5,444,632 A | * | 8/1995 | Kline et al. | 700/100 |
| 5,740,053 A | * | 4/1998 | Iwama | 700/121 |
| 5,838,565 A | * | 11/1998 | Hsieh et al. | 700/11 |

* cited by examiner

*Primary Examiner*—Leo Picard
*Assistant Examiner*—Sean Shechtman
(74) *Attorney, Agent, or Firm*—Tung & Associates

(57) ABSTRACT

A flexible recipe modeling system and method is provided for improving the processing reliability of a fabrication process by customizing recipes processed by fabrication equipment including associated different chambers of a multi-chamber processing machine by allowing a responsible engineer to add or modify individual recipe clusters including grouping of recipes into clusters to represent the same process capacity for a piece of fabrication equipment and providing a material execute system having a recipe cluster management engine (RCME) for management of the RCMS.

15 Claims, 5 Drawing Sheets

| CHAMBER | STATUS | FUNCTION |
|---|---|---|
| NEP002 #1 | AVAILABLE | POLY-ETCH |
| NEP002 #2 | AVAILABLE | POLY-ETCH |
| NEP002 #3 | UNAVAILABLE | ZERO-ETCH |

(PRIOR ART) FIG. 1

| CHAMBER | STATUS | FUNCTION |
|---|---|---|
| NEP002 #1 | UNAVAILABLE | POLY-ETCH |
| NEP002 #2 | UNAVAILABLE | POLY-ETCH |
| NEP002 #3 | AVAILABLE | ZERO-ETCH |

SELECT CHAMBER — 40

| EQUIP I.D. | CHAMBER | OLD GROUP | NEW GROUP |
|---|---|---|---|
| NEPOL2 | | | |
| NEPOL2 | #1 | | |
| NEPOL2 | #2 | | |
| NEPOL2 | #3 | | |

[EXIT] [RECIPE CLUSTER] [CLEAR] [CONFIRM]

FIG. 7

CANDIDATE RECIPE CLUSTER — 42

EQUIPMENT I.D. [NEPOL2]

CHAMBER I.D. [#1]

- POLY-ETCH ✓
- ZERO-ETCH

[EXIT] [RECIPE LIST] [SELECT CLUSTER]

FIG. 8

RECIPE LIST — 44

CLUSTER [POLY-ETCH]

- NE-ETCICP ✓
- NE-N-POLY ✓
- NE-N-MOX ✓

[EXIT]

FLEXIBLE RECIPE MODELING AND RECIPE CLUSTER MANAGEMENT SYSTEM

FIELD OF THE INVENTION

The present invention discloses a flexible recipe modeling system and method for processing of recipes within a wafer fabrication process.

BACKGROUND OF THE INVENTION

In a single product or stable process manufacturing environment, it is easy to control the manufacturing process using a simple material control system. However, such a system does not exist in a semiconductor foundry. There are a variety of products from different industries and from a large variety of customers. To control a wafer processing, a material control system uses a sequence of recipes that contain a process location and a processing parameter. A variety of products require processing using a large and varied assortment recipes. More particularly, the problems encountered to service a variety of products and to manage a large and varied assortment of recipes in a semiconductor or wafer production FAB involve manufacturing engineers, process engineers, specification management engineers, and automation engineers.

Manufacturing engineers have problems targeting equipment for manufacturing due to limited resources and different due dates required for each piece of manufacturing equipment for a variety of different customers. A manufacturing engineer must manage the switching of a process equipment's recipe cluster offline to set limits for processing within a processing machine according to a complex rule naming method.

Additionally, process engineers could not perform differing processing operations using multi-chamber equipment because it is hard to manage a great deal of recipes distributed widely on a variety of equipment. Also, the process engineer cannot access the recipe specification directly but is forced to perform batch processing of recipes.

The specification management engineer must modify recipe specifications frequently and define equipment constraints to allow a piece of fabrication equipment to process an order using a specified process. Only one process at a time could be performed by the piece of fabrication equipment. If a new process needed to be performed by the piece of fabrication equipment, processing requirements within the fabrication equipment had to be changed offline, thus contributing to lower yield within the FAB process.

Conventional material processing systems require complex restriction rules for each piece of equipment to prevent misprocessing of a lot order. Also, conventional material processing systems do not allow assignment of different recipe clusters to different chambers of a multi-chamber piece of fabrication equipment.

The naming rules of the conventional material processing systems required that chambers within a specified piece of multi-chamber processing equipment were processed according to an availability status. Only the lots requiring similar processing could be processed simultaneously by the multi-chamber equipment.

For example, as shown in prior art FIGS. 1 and 2, a matrix showing the equipment constraints of multi-chamber piece of processing equipment identified as NEP002 is provided. The identified equipment has three chambers, chamber NEP002#1, chamber NEP002#2, and chamber NEP002#3 for processing three lots, lot one, lot two, and lot three associated with each chamber respectively, wherein lots one and two require processing using a poly-etch process and lot 3 requires processing using a zero-etch process. In order for the equipment to process the three lot orders, the ME (manufacturing engineer) would manually assign a status to each chamber according to the required process to be performed on each lot.

More particularly, referring to FIG. 1, when lots 1 and 2 requiring the poly-etch process needed processing within chamber 1 and 2 respectively, the status for chamber 1, and 2 would be set to an available status, and status for chamber 3 would be set to an unavailable status to prevent processing of the zero etch lot 3 within chamber 3.

Similarly, referring to FIG. 2, when the lot 3 requiring a zero etch process needed processing within chamber 3, the status for chamber 3 would be set to an available status, and the status for chambers 1 and 2 would be set to an unavailable status to prevent processing of the poly etch lot 1 and 2 within chambers 1 and 2. Thus, because each chamber had to process orders using a set of manually defined rules that prevention of different processes being performed simultaneously within a multi-chamber piece of fabrication equipment, orders could not be automatically executed within a chamber using a MES (material execute system) and the overall efficiency of the system would be reduced. Also, when a specific recipe was not provided to an associated piece of fabrication equipment, the fabrication process would stop to allow for the processing capacity of the equipment to be set accordingly.

Therefore, it is an object of the present invention to provide a method and system to handle those problems for recipe grouping.

It is an object of the present invention to provide a system and method that allows a process engineer to groups recipes into different clusters according to a piece of fabrication machine's process capacity.

It is desirable to provide a method providing a new operating flow for an automated fabrication process.

It is an object of the present invention to group recipes into clusters according to processing capability instead of by ownership of a particular customer order.

It is another object of the present invention to provide a material execute system (MES) having a recipe cluster management engine (RCME) for use with a distributed client-server architecture.

It is another object of the present invention to provide an interface for a user, such as a manufacturing engineer (ME) to manage recipe clusters online using the MES.

It is another object of the present invention to provide an online switching of an equipment's processing capabilities according to a specified recipe cluster.

It is another object of the present invention to improve the processing reliability of a fabrication process by customizing recipes processed by each equipment by allowing a process engineer (PE) to add or modify individual recipe clusters.

It is another object of the present invention to provide a mechanism within the MES to translate proper recipes to a specified piece of fabrication equipment.

It is a further object of the present invention to provide an MES that allows assignment of different recipe cluster to different chambers of a multi-chamber piece of fabrication equipment.

It is yet another object of the present invention to provide a system that allows multi-chamber equipment to simultaneously process different recipe combinations in multiple chambers disposed within a piece of multi-chamber equipment.

The present invention eliminates the complex naming conventions of the existing processing systems by providing a user interface to perform an associated recipe cluster function setup associated with each chamber within the processing equipment.

SUMMARY OF THE INVENTION

In general present invention provides a system and method for improving the processing reliability of a fabrication process by customizing recipes processed by each equipment by allowing a responsible engineer to add or modify individual recipe clusters.

More particularly, the present system and method provides a recipe cluster management system (hereinafter "RCMS") for grouping of recipes into clusters to represent the same process capacity for a processing machine or a piece of fabrication equipment and provides a recipe cluster management engine (hereinafter "RCME") into a material execute system for (hereinafter "MES") for management of the RCMS. The plug-in engine provides a series of operative functions to the MES. The present invention provides a user interface to simplify complex naming rules for processing of lot orders having different processing capacity requirements for associated different chambers of a multi-chamber processing machine. More specifically, the RCMS provides:

a material execute system having a recipe cluster management engine (RCME) in operative communication with the material execute system;

a specification database in operative communication with the material execute system (MES) for storing predefined recipe clusters, wherein each recipe cluster has at least one associated recipe parameter and a specified location;

a run time floor database, the run time floor database in operative communication with a real time dispatching (RTD) system for sequencing processing of orders according to a predefined schedule, wherein the real time dispatching system (RTD) is in further operative communication with the material execute system (MES); and at least one piece of fabrication equipment, wherein the equipment is in operative communication with the material execute system (MES) and wherein the equipment has an operator interface that allows an operator to monitor only candidate lots provided to the equipment by the real time dispatching (RTD) system, and to track the candidate lots into the at least one piece of fabrication equipment according to a predefined schedule.

Another feature of the RCME is a graphical user interface (hereinafter "GUI") having a plurality of operative screens used with an associated graphical user interface (GUI) having a plurality of pop up menus, the pop-up menus having an equipment setup menu for assigning recipe clusters to associated chambers within a piece of fabrication equipment, a select chamber menu for associating recipe clusters with a chamber disposed within the at least one piece of fabrication equipment, a candidate recipe cluster menu for displaying and selecting candidate recipe clusters, and a recipe list menu for displaying a recipe list associated with a candidate recipe cluster.

The material execute system (MES) and the real time dispatching (RTD) system cooperate to automatically process orders according to processing requirements identified within the recipe cluster function setup submenu.

Additionally, a method of using the RCMS to provide a flexible modeling system provides the steps of:

providing a complete set of recipe clusters capable of being processed on a plurality of associated fabrication equipment;

using a graphical user interface (GUI) to provide a recipe list for a particular fabrication process to be performed according to requirements of a recipe cluster;

assigning a recipe cluster from the complete set of recipe clusters to a specified piece of equipment according to an equipment's processing capacity; and accessing a recipe cluster for modification of the recipe cluster according to the processing capacity requirements of an associated piece of fabrication equipment.

Additionally the RCMS is further enhanced by using the material execute system (MES) to perform the steps of:

cooperating with a run-time floor database and a specification database to determine processing requirements for a next lot order, wherein the specification database is in communication with the run-time floor database, and wherein the run-time floor database is in communication with a RTD system to receive the next lot order;

inquiring about a current order's lot processing status;

tracking in of an order from the RTD system to a specified piece of fabrication equipment for processing of the order in accordance with a predefined recipe function setup; and translating a recipe specified in the specification database for use in an associated piece of fabrication equipment according to a processing capacity of the equipment.

Another attractive feature of the present invention is providing a method to use the recipe cluster management system to define new processes and allocate new equipment resources within a fabrication process.

BRIEF DESCRIPTION OF THE DRAWINGS

FIG. 1 is an illustration of an equipment constraint matrix of the prior art.

FIG. 2 is an illustration of an equipment constraint matrix of the prior art.

FIG. 6 is an illustration of a chamber select menu in accordance with a GUI of the present invention.

FIG. 7 is an illustration of a candidate recipe cluster menu used in accordance with a GUI of the present invention.

FIG. 8 is an illustration of a recipe list menu used in accordance with a GUI of the present invention.

DETAILED DESCRIPTION OF THE PREFERRED EMBODIMENTS

The present invention provides a system and method that provides: traceable and real time control of fabrication equipment resources; multi-chamber fabrication equipment to simultaneously process different recipe clusters (RC) within multiple chambers; systematic organization of recipes into recipe clusters (RC) to reduce production risk; a mechanism to optimize allocation of engineering resources by allowing a ME (manufacturing engineer) to focus on resource planning, a PE (process engineer) to focus on production yield improvement, an SME (specification management engineer) to focus on correction of specification definitions; elimination of redundant equipment constraint limitations by eliminating recipe naming rules previously necessary to control a processing capacity of a piece of fabrication equipment; and fabrication equipment capable of operating in an automatic mode to switch equipment capacity by choice of different recipe clusters.

The present system and method provides a recipe cluster management system (RCMS) for grouping of recipes into clusters to represent the same process capacity for a processing machine or a piece of fabrication equipment and provides a recipe cluster management plug-in engine (RCME) into a MES for management of the RCMS. The plug-in engine provides a series of operative functions to the MES. The present invention provides a user interface to simplify complex naming rules for processing of lot orders having different processing capacity requirements for associated different chambers of a multi-chamber processing machine.

Figure 3:
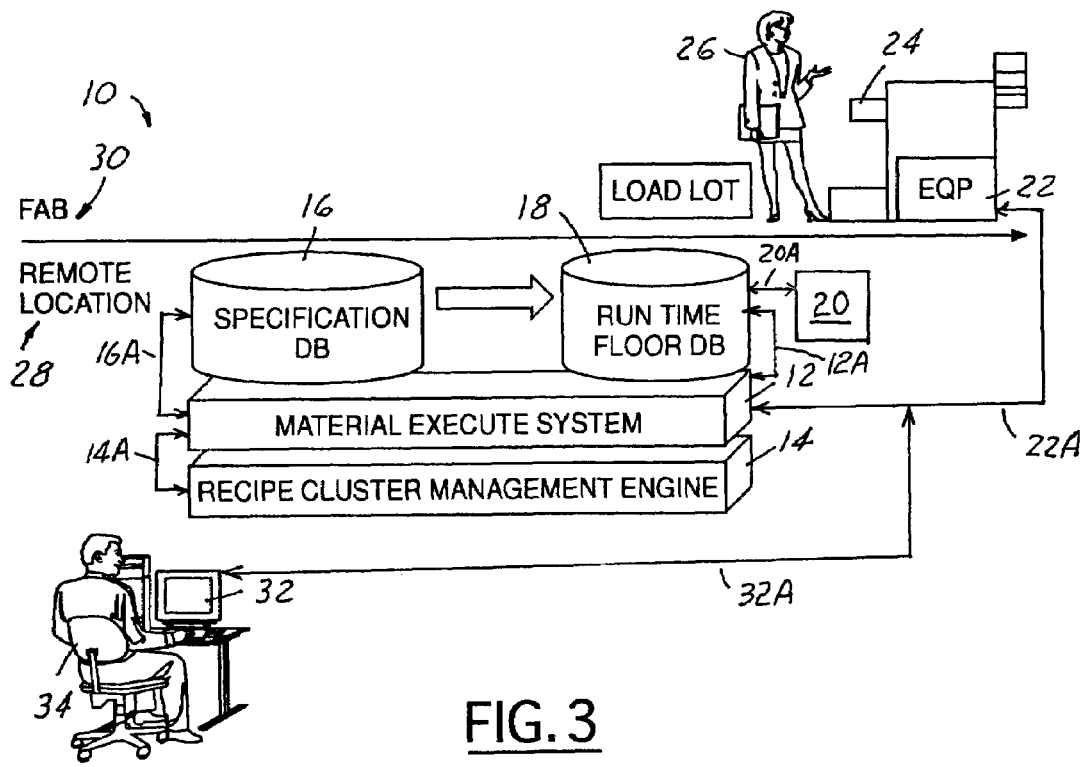
FIG. 3 is an overview of the recipe cluster management system in accordance with the present invention.

Referring now to the drawings, FIG. 3 illustrates an overview of the flexible recipe modeling system in accordance with the present invention. The flexible recipe modeling system provides a RCMS 10, the RCMS 10 providing a MES 12 having a RCMS engine 14 in operative communication (e.g., 14a) with the MES 12; a specification database 16 in operative communication (e.g., 16a) with the MES 12 for storing predefined processing recipe clusters, wherein each recipe cluster has at least one associated recipe parameter and a specified location; a run time floor DB 18, the run time floor DB is in operative communication (e.g., 16A) with a dispatching or a real time dispatching (RTD) system 20 for sequencing processing of orders according to a predefined schedule; at least one piece of fabrication equipment 22, wherein the equipment 22 is in operative communication (e.g., 22A) with the MES 12 and wherein the equipment 22 has an operator interface 24 that allows an operator 26 to monitor only candidate lots provided to the equipment by the RTD system 20, the RTD system 20 in communication (e.g., 12A) with the MES 12, and to track candidate lots into the equipment. The recipes stored within the specification database 16 are sent to the run time floor DB 18 for associating RC (recipe clusters) stored within the specification database 16 with candidate lots (not shown) to be processed according to a predefined schedule. Preferably, the MES 12, the specification DB 16, and the run time floor DB 18 are located at a remote location 28, and the at least one piece of fabrication equipment 22 is located at the FAB facility 30. The equipment 22, preferably, is in operative communication with the MES 12, the specification DB 16, and the run time floor database 18 via client-server architecture.

A user of the system, preferably, an SME, a PE, or a ME can control the FAB process from a remote location using client-server architecture preferably, through use of at least one client or remote computer 32 wherein the at least one remote computer 32 is in operative communication (e.g., 32A) with the RTD 20, the MES 12, the RCMS 10, and the piece of fabrication equipment 22. In operation, an operator or automation engineer 34 receives accurate instructions from the MES 12 and the RCMS 10 to process a lot according to a recipe cluster as defined by the RCMS 10 by a responsible engineer using an associated piece of fabrication equipment 22. Thus, the RCMS 10 eliminates redundant paper work and uses client-server architecture to coordinate communications between each engineer involved in the wafer fabrication process to allow a PE to focus on yield improvement, a ME to focus on resource planning, and an SME to correct specification definitions. Thus, an operator or automation engineer can only see the candidate lot and track in or execute the lot into the associated piece of fabrication equipment 22.

Figure 4:
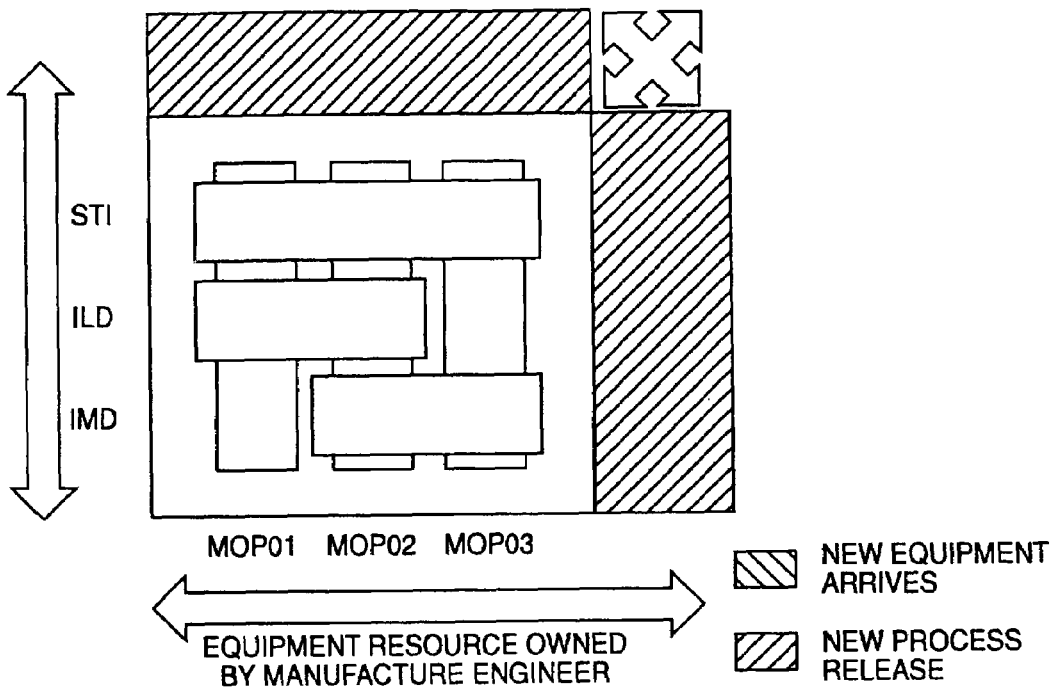
FIG. 4 is a responsibility matrix for a process engineer, a manufacturing engineer, and a specification management engineer in accordance with the present invention.

Each recipe cluster or group communicated from the RCMS 10 to the MES 12 has a process location for a semiconductor device manufacturing process, e.g., shallow trench isolation (STI), inter-layer dielectric (ILD), and inter-metal dielectric (IMD), and an associated piece of fabrication equipment, and a processing parameter specifying a specific recipe cluster for performing a process within the associated piece of fabrication equipment. A responsible engineer as shown in an engineering responsibility matrix in FIG. 4 can add on a recipe to a recipe cluster, extract a recipe from a cluster, assign a recipe cluster to a piece of fabrication equipment, discharge a recipe cluster from a piece of equipment, and inquire about allowable recipe clusters for a specific piece of fabrication equipment.

Preferably, the RCME 10 has an associated GUI 36 having portions as displayed in FIGS. 5–8 illustrating a plurality of pop up menus provided by the GUI 36, the plurality of pop up menus providing an equipment setup menu 38, a select chamber menu 40, a candidate recipe cluster menu 42, and a recipe list menu 44.

Figure 5:
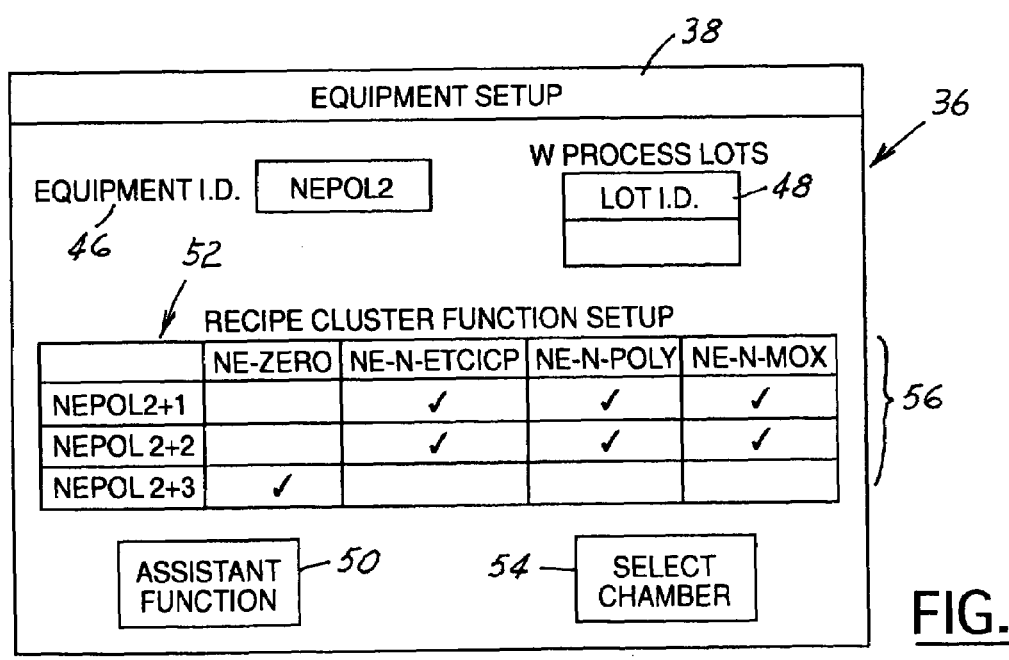
FIG. 5 is an illustration of an equipment setup menu having a recipe cluster function setup submenu used in accordance with a GUI of the present invention.

As shown in FIG. 5, the equipment setup menu 38 is provided for assigning recipe clusters to associated chambers within a piece of fabrication equipment. The equipment setup menu 38 has an Equipment ID field 46 for inserting an equipment identification, a process lots field 48 for identifying at least one lot ID being processed by the associated piece of fabrication equipment 22, an assistant function button 50 for displaying a recipe cluster function setup submenu 52, a select chamber button 54 for displaying a select chamber menu 40. Upon selecting the assistant function button 50, the recipe cluster function setup submenu 52 is displayed. The recipe cluster function setup submenu 52 provides at least one or a plurality of columns, wherein each column is associated with a row, and wherein each column represents a recipe within a recipe cluster, and each row represents a chamber disposed within the at least one piece of fabrication equipment. Associated with each column and row are a plurality of fields 56 having an indicator flag either set to show the selection of a recipe or not set to show the nonselection of a recipe associated with a recipe cluster to be performed within an associated chamber.

The select chamber menu 40 is provided upon selecting the select chamber button 54 on the equipment setup menu 38. The select chamber menu 40 having an equipment ID column 60, a chamber identification column 62, an old group column 64, and a new group column 66. Each column has a plurality of selectable fields 68 disposed therewithin for insertion of a recipe cluster used to perform a processing function. The fields 68 disposed within each column may be changed by selecting a recipe cluster button 70, or a clear button 72. Upon selecting a field 68 within the old group or the new group column and then selecting a recipe cluster button 70, a candidate recipe cluster menu 42 is provided to display or to select a recipe cluster representing a processing operation to be performed within an equipment chamber.

Upon selecting the clear button 72 for a selected field 68, recipe cluster information displayed within the field will be erased or cleared. After modifications or changes are made to the fields, the changes may be confirmed by selecting a confirm button 76 and then selecting an exit button 78 to return to the equipment set up menu 38.

The candidate recipe cluster menu 42 preferably has at least two fields 80, 82 for identifying an equipment id and a chamber id, and at least one field 84 for displaying recipe clusters, a recipe list button 86, a select cluster button 88, and an exit button 90. The at least one recipe cluster field 84 provides at least one or alternatively, a plurality of recipe clusters for a user to select. A specific recipe or a plurality of recipes within the plurality of recipe clusters may be selected by selecting an enter selection button for insertion into the old group column 64 or new group column 66 disposed within the select chamber menu 40. A user may display a specific recipe list for a selected recipe group by selecting a recipe list button 86. Access to modify recipe clusters within the candidate recipe cluster menu 42 is not provided within the recipe cluster setup but rather is provided by using the remote client or computer 32. The recipe clusters are predefined, preferably by a process engineer wherein only recipe clusters turned on for an associated piece of processing equipment will be displayed within the candidate recipe cluster menu. Recipe clusters that are turned on will automatically be translated by the MES 12 and be processed as specified within a piece of fabrication equipment 22 according to batch processing or automatic sequencing of lots as specified by the RTD system 20. Recipe clusters that are turned off will not be translated by the MES 12, and thus will not be processable on an associated piece of fabrication equipment 22.

The recipe list menu 44 is provided upon selecting the recipe list button 86. The recipe list menu 44 provides a display 92 of a recipe cluster and associated recipes 74 within the recipe cluster, and an exit button 94. Upon selecting the exit button 94, a user will return to the candidate recipe cluster menu 42.

In a preferred embodiment as shown in FIGS. 5–8, the GUI menus 38, 40, 42, and 44 are graphically illustrated to specify a recipe cluster function set-up of a piece of fabrication equipment 22 preferably having a plurality of chambers, e.g., equipment I.D. NEPOL2 chamber #1, as shown in FIG. 7. A plurality of recipe groups available for processing by each chamber, e.g., chamber#1, are displayed in a plurality of columns (fields), e.g., recipe groups (clusters) indicated in columns headed POLY-ETCH AND ZERO-ETCH. As shown, in FIG. 8 a plurality of recipes NE-ETCICP, NE-N-POLY, and NE-N-MOX associated with a recipe cluster (e.g., POLY-ETCH), are selected as indicated by a associated indicator flags e.g., 96 to perform a poly-etch operation in chamber 1. It will be appreciated that the same or different etch operations such as zero-etch or poly-etch may also be selected for different chambers comprising the same piece of fabrication equipment, e.g., to be carried out simultaneously in a multi-chamber etch system, e.g., 22.

Recipe cluster poly-etch requires the recipe list NE-ETCICP, NE-N-POLY, and NE-N-MOX, as shown in the in the recipe list display 44 upon operation of the select cluster function (button) and the recipe list function as shown in FIG. 7. Thus, in operation each chamber may be set up to process a selected recipe by selecting the chamber in FIG. 6, operating the recipe cluster function (button) to bring up the candidate recipe cluster menu in FIG. 7, operating the select cluster function, and then operating the recipe list function to bring up the recipe list shown in FIG. 8 to select on or more processing recipes. Thus, the poly etch may be run in chambers 1 and 2 and the zero etch may be simultaneously run in chamber 3.

The MES 12 and the real time dispatching system 20 cooperate to automatically process lot orders according to processing requirements as shown in the recipe cluster function setup submenu 42. The MES 12 translates only recipes specified by the recipe cluster function setup when the recipe cluster function setup is turned on for processing by a piece of fabrication equipment, any other recipes accidentally sent to the machine will not be translated for processing. Thus, an operator accidentally tracking in a lot from the RTD system 20 requiring processing other than poly-etch or zero etch will not be able to perform such a process on the associated piece of fabrication equipment 22.

Figure 9:
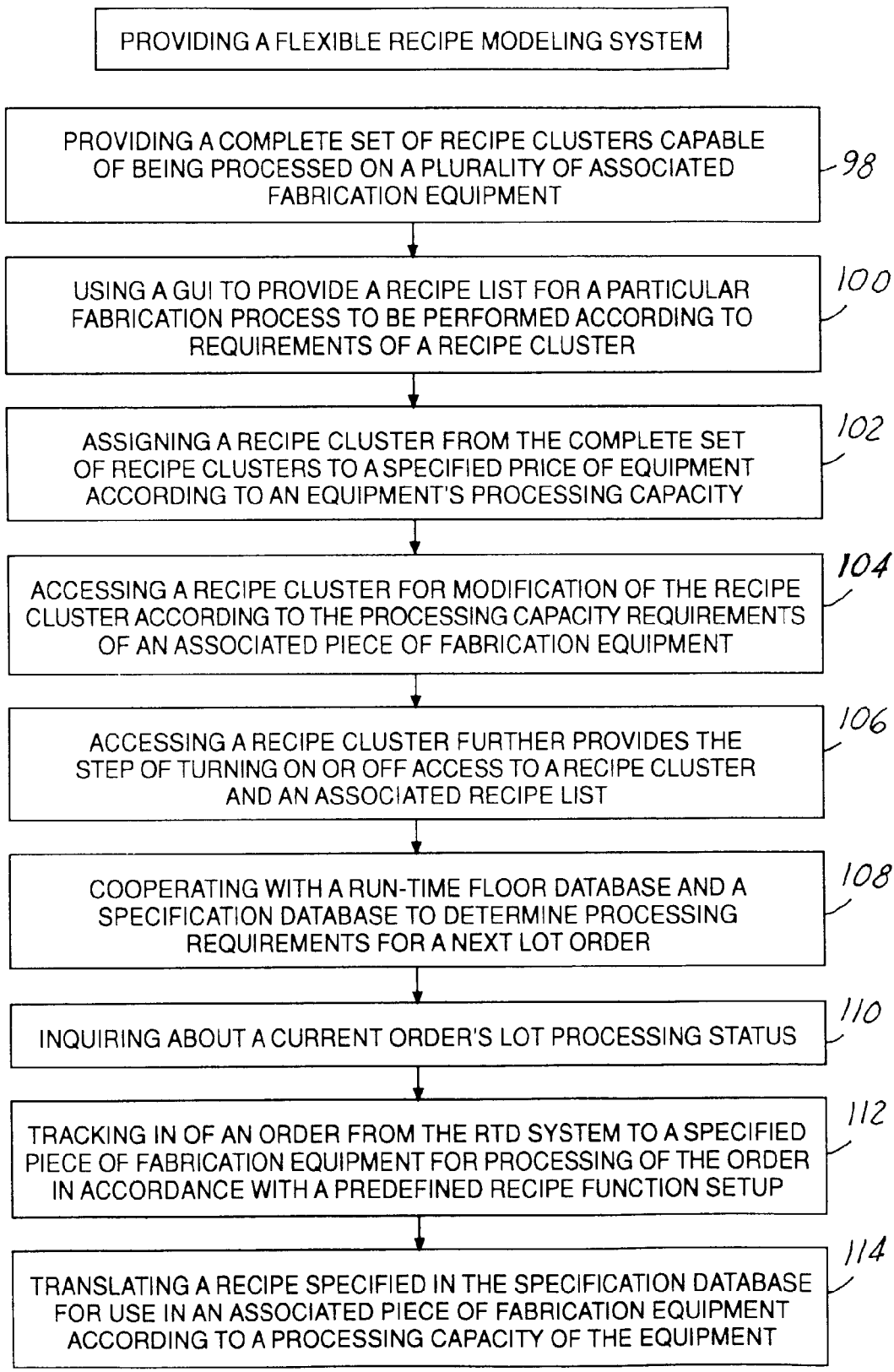
FIG. 9 is a flow chart depicting a method of using the recipe cluster management system in accordance with the present invention.

As shown in FIG. 9, a method is provided to use the recipe cluster management system 10 in accordance with the present invention to perform the steps of:

providing a complete set of recipe clusters capable of being processed on a plurality of associated fabrication equipment (step 98);

using a GUI to provide a recipe list for a particular fabrication process to be performed according to requirements of a recipe cluster (step 100);

assigning a recipe cluster from the complete set of recipe clusters to a specified piece of equipment according to an equipment's processing capacity (step 102); and accessing a recipe cluster for modification of the recipe cluster according to the processing capacity requirements of an associated piece of fabrication equipment (step 104), wherein the step of accessing a recipe cluster further provides the step of turning on or off access to a recipe cluster and an associated recipe list (step 106).

Preferably, the MES system is used to perform the following additional steps:

cooperating with a run-time floor database and a specification database to determine processing requirements for a next lot order, wherein the specification database is in communication with the run-time floor database, and wherein the run-time floor database is in communication with a RTD system to receive the next lot order (step 108);

inquiring about a current order's lot processing status (step 110);

tracking in of an order from the RTD system to a specified piece of fabrication equipment for processing of the order in accordance with a predefined recipe function setup (step 112); and translating a recipe specified in the specification database for use in an associated piece of fabrication equipment according to a processing capacity of the equipment (step 114).

The step of assigning a recipe cluster from the full set of recipe cluster groups to a specified piece of equipment according to an equipment's processing capacity (step 116) further includes the step of:

using a GUI having a plurality pop-up menus to simultaneously process different recipe clusters within a multi-chamber piece of fabrication equipment, wherein the plurality of pop-up menus comprise an equipment setup menu, the equipment setup menu having a recipe cluster function setup menu, a select chamber menu, and a candidate recipe cluster menu to select desired candidate recipe groups from the candidate recipe cluster menu to be processed within a selected chamber as defined using the select chamber menu for insertion into the recipe cluster function setup menu (step 118, shown in FIGS. 5–8).

Figure 10:
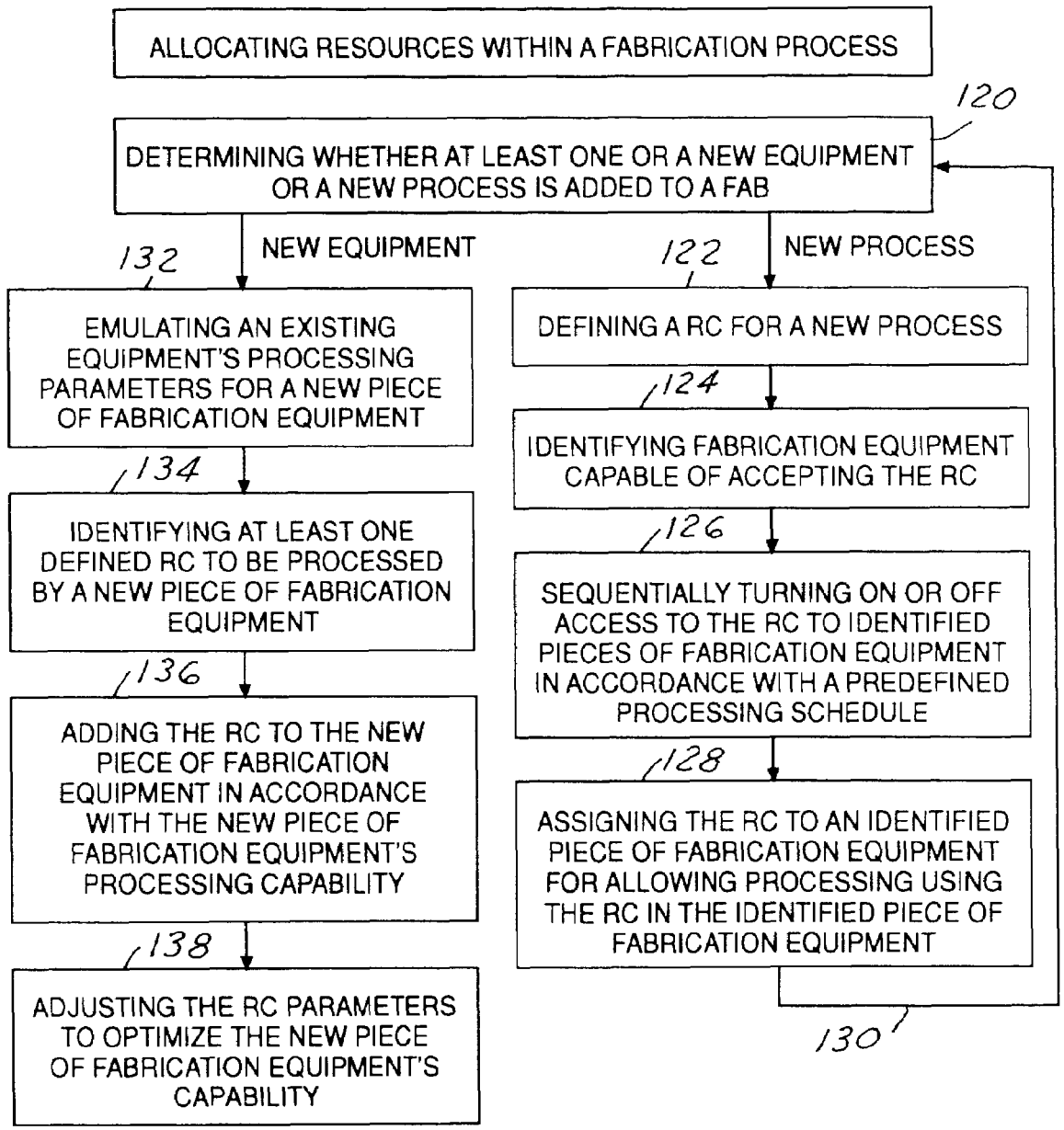
FIG. 10 is a flow chart depicting allocation of resources within a fabrication process.

Additionally, FIG. 10 illustrates a flowchart depicting a method provided to use an MES having a RSME to allocate resources within a fabrication process providing the steps of:

1) determining whether at least one of a new equipment or a new process is added to a FAB (step 120);

2) if a new process is added, performing the steps of
a) defining a RC for a new process (step 122);
b) identifying fabrication equipment capable of accepting the RC (step 124);
c) sequentially turning on or off access to the RC to identified pieces of fabrication equipment in accordance with a predefined processing schedule (step 126);
d) assigning the RC to an identified piece of fabrication equipment for allowing processing using the RC in the identified piece of fabrication equipment (step 128);
e) repeating steps a-d until a new process is not longer added (step 130);

3) if a new piece of fabrication equipment is added, performing the steps of
a) emulating an existing equipment's processing parameters for a new piece of fabrication equipment (step 132);
b) identifying at least one defined RC to be processed by a new piece of fabrication equipment (step 134);
c) adding the RC to the new piece of fabrication equipment in accordance with the new piece of fabrication equipment's processing capability (step 136); and
d) adjusting the RC parameters to optimize the new piece of fabrication equipment's processing capability (step 138).

In one preferred embodiment, as can be gleaned from the drawings, the present invention is employed for modeling a flexible recipe system and method particularly useful as part of the manufacture of semiconductor wafers in a fully automated fab. However, the present invention can be employed for other manufacturing processes, materials and applications.

From the foregoing, it should be appreciated that a system and method are provided for flexibly processing recipes within a fully automated fabrication facility. While a preferred exemplary embodiment has been presented in the foregoing detailed description, it should be understood that a vast number of variations exist and this preferred exemplary embodiment is merely an example, and it is not intended to limit the scope, applicability or configuration of the invention in any way. Rather, the foregoing detailed description provides those of ordinary skill in the art with a convenient guide for implementing a preferred embodiment of the invention and various changes can be made in the function and arrangements of the exemplary embodiment without departing from the spirit and scope of the appended claims.

What is claimed is:

1. A recipe cluster management system comprising:
a material execute system having a recipe cluster management engine in operative communication with the material execute system;
a specification database in operative communication with the material execute system for storing predefined recipe clusters, wherein each recipe cluster has at least one associated recipe parameter and a specified location;
a run time floor database, the run time floor database in operative communication with a real time dispatching system for sequencing processing of orders according to a predefined schedule, wherein the real time dispatching system is in further operative communication with the material execute system;
at least one piece of fabrication equipment, wherein the at least one piece of fabrication equipment is in operative communication with the material execute system and wherein the at least one piece of fabrication equipment has an operator interface that allows an operator to monitor only candidate lots provided to the at least one piece of fabrication equipment by the RTD system, and to track the candidate lots into the at least one piece of fabrication equipment according to a predefined schedule; and
an associated graphical user interface for assigning recipe clusters to associated chambers within the at least one piece of fabrication equipment wherein said associated graphical user interface comprises:
an equipment setup menu for assigning the recipe clusters to the associated chambers within the piece of fabrication equipment,
a select chamber menu for associating recipe clusters with a chamber disposed within the at least one piece of fabrication equipment,
a candidate recipe cluster menu for displaying and selecting candidate recipe clusters, and
a recipe list menu for displaying a recipe list associated with a candidate recipe cluster.

2. The system of claim 1 wherein the predefined recipe clusters comprise:
a process location for an associated piece of fabrication equipment, and a processing parameter, wherein the processing parameter defines a recipe list.

3. The system of claim 1 wherein the material execute system, the specification database, and the run time floor database are located at a remote location, and the at least one piece of fabrication equipment is located at a fabrication facility.

4. The system of claim 1, wherein the equipment setup menu comprises:
an equipment identification field for inserting the associated piece of fabrication equipment identification;
a process lots field for identifying at least one lot identification being processed by the associated piece of fabrication equipment;
an assistant function button for displaying a recipe cluster function setup submenu; and
a select chamber button for displaying the select chamber menu.

5. The system of claim 4 wherein the recipe cluster function setup submenu comprises:
a plurality of recipes comprising a recipe cluster wherein each recipe is associated with a chamber disposed within the at least one piece of fabrication equipment;
wherein a plurality of fields are associated with each recipe and each chamber, the plurality of fields comprise a plurality of indicator flags indicating the processing status of each chamber.

6. The system of claim 1, wherein the select chamber menu comprises:
a recipe cluster function for selecting the candidate recipe cluster menu;
an exit function for exiting the select chamber menu and returning to the equipment setup menu;
a confirm function for confirming a recipe cluster selection;
an equipment identification field;
a chamber identification field;
an old group field;

a new group field;

a clear function for clearing recipe clusters disposed within at least one of the old group field and the new group field; and a plurality of second selectable fields disposed within the old group field and the new group field for insertion of a recipe cluster used to perform a processing function within a specified chamber of the at least one piece of fabrication equipment, and wherein the plurality of second selectable fields disposed within the old group field and the new group field may be modified by selecting at least one of the recipe cluster function and the clear function.

7. The system of claim 6 wherein the candidate recipe cluster menu comprises:

an equipment identification field for identifying the at least one piece of fabrication equipment;

a chamber identification field for identifying an associated chamber within the at least one piece of fabrication equipment;

a recipe cluster display for displaying recipe clusters;

a recipe list function for selecting a recipe list menu;

a select cluster function for selecting a recipe cluster from the recipe cluster display; and an exit function to exit to the select chamber menu.

8. The system of claim 7 wherein the recipe list menu comprises:

a display of a recipe cluster and an associated recipes list within the recipe cluster; and an exit function for exiting to the candidate recipe cluster menu.

9. The system of claim 4 wherein the material execute system and the real time dispatching system cooperate to automatically process orders according to processing requirements identified within the recipe cluster function setup submenu.

10. A method for using the recipe cluster management system of claim 1 to manage processing recipes associated with fabrication equipment comprising the steps of:

providing a complete set of recipe clusters comprising recipes capable of being processed on a plurality of associated fabrication equipment;

selecting according to the graphical user interface a recipe list for a particular fabrication process to be performed according to requirements of a recipe cluster;

assigning a recipe cluster from the complete set of recipe clusters to a specified piece of associated fabrication equipment according to the associated fabrication equipment's processing capacity; and accessing a recipe cluster for modification of the recipe cluster according to the processing capacity requirements of the associated fabrication equipment.

11. The method of claim 10 wherein the step of accessing a recipe cluster further comprises the step of:

turning on or off access to the recipe cluster and an associated list of recipes.

12. The method of claim 10 further comprising the steps of:

determine processing and scheduling requirements for a next lot order according to, the specification database, run-time floor database, and the RTD system said step of determining comprising;

inquiring about a current order's lot processing status according to the run-time floor database;

tracking in of the next lot order from the RTD system to a specified piece of fabrication equipment for processing of the order in accordance with a predefined recipe; and translating a recipe specified in the specification database for use in an associated piece of fabrication equipment according to a processing capacity of the associated piece of fabrication equipment.

13. The method of claim 10 wherein the step of assigning a recipe cluster from the complete set of recipe clusters further comprises:

selecting according to the graphical user interface to recipe clusters tor simultaneously process different recipe clusters within a multi-chamber piece of fabrication equipment wherein the step of selecting comprises:

selecting the piece of fabrication equipment for processing the plurality of recipe clusters;

selecting the chamber to process a processing recipe comprising the plurality of recipe clusters;

selecting the recipe from a list of candidate recipes.

14. The method of claim 10 further comprising the step of:

defining new processes and allocating new equipment resources within a fabrication process.

15. The method of claim 14 further comprising the steps of:

A) determining whether at least one of a piece of new equipment and a new process is added to a fabrication;

B) performing a plurality of new process substeps when a new process is added to a fabrication process, the new process substeps comprising:

i) defining a recipe cluster for a new process, ii) identifying fabrication equipment capable of accepting the recipe cluster, iii) sequentially turning on or off access to the recipe cluster to identified pieces of fabrication equipment in accordance with a predefined processing schedule, iv) assigning the recipe cluster to an identified piece of fabrication equipment for allowing processing using the recipe cluster in the identified piece of fabrication equipment;

v) repeating steps Bi–v until a new process is no longer added; and

C) performing a plurality of new equipment substeps when a new piece of fabrication equipment is added to a fabrication process, the new equipment substeps comprising:

i) emulating an existing equipment's processing parameters for a new piece of fabrication equipment, ii) identifying at least one defined recipe cluster to be processed by a new piece of fabrication equipment, iii) adding the at least one defined recipe cluster to the new piece of fabrication equipment in accordance with the new piece of fabrication equipment's processing capability, and iv) adjusting the at least one defined recipe cluster operating parameters to optimize the new piece of fabrication equipment's processing capability.

* * * * *